United States Patent [19]

Chatterjee et al.

[11] Patent Number: 5,900,201
[45] Date of Patent: May 4, 1999

[54] BINDER COAGULATION CASTING

[75] Inventors: Dilip K. Chatterjee; Syamal K. Ghosh, both of Rochester; James S. Reed; William J. Walker, Jr., both of Alfred, all of N.Y.; Dilip H. Doshi, Hillsboro, Oreg.

[73] Assignee: Eastman Kodak Company, Rochester, N.Y.

[21] Appl. No.: 08/931,174

[22] Filed: Sep. 16, 1997

[51] Int. Cl.⁶ .................................................. C04B 33/28
[52] U.S. Cl. ........................ 264/109; 264/669; 264/670
[58] Field of Search .................................. 264/109, 669, 264/670

[56] References Cited

U.S. PATENT DOCUMENTS

| | | | |
|---|---|---|---|
| 2,847,314 | 8/1958 | Fisher | 264/670 |
| 4,734,237 | 3/1988 | Fanelli et al. | 264/328.2 |
| 4,894,194 | 1/1990 | Janney | 264/109 |
| 4,908,172 | 3/1990 | Sterzel et al. | 264/328.2 |
| 5,132,255 | 7/1992 | Takeuchi et al. | 501/94 |
| 5,188,780 | 2/1993 | Lange | 264/669 |
| 5,238,627 | 8/1993 | Matsuhisa | 264/328.2 |
| 5,250,251 | 10/1993 | Fanelli et al. | 264/109 |

OTHER PUBLICATIONS

Ceramic Materials and Components for Engines, "Direct Coagulation Casting (DCC)—Principles of a New Green Shaping Technique" by Fraule et al, pp. 627–630, 1994.

*Primary Examiner*—James Derrington
*Attorney, Agent, or Firm*—Arthur H. Rosenstein; Mark G. Bocchetti

[57] ABSTRACT

A method of preparing ceramics having the steps of forming an aqueous slurry of deflocculant, ceramic powder and binder and causing the slurry to get into a semi-rigid solid by adding a chemical initiator and/or increasing the temperature of the slurry.

19 Claims, No Drawings

BINDER COAGULATION CASTING

FIELD OF THE INVENTION

The present invention relates to a process for fabricating ceramics having lower organic content, good green strength and are capable of being cast into complex shapes.

BACKGROUND OF THE INVENTION

Ceramic materials having high strength and moldability are useful as tools and other articles which require a great deal of use and must do heavy work such as cutting tools.

For many technological applications it is desirable to fabricate ceramic parts with complex geometry. Since ceramic materials are inherently hard, shaping by machining methods after the part is fired is difficult and expensive. Therefore, it is desirable to form ceramic parts close to their final shape in order to minimize the amount of machining required on the final fired part. Two categories of methods are used to achieve complex shapes: green machining methods, and near-net shape forming methods. Green machining refers to shaping an unfired ceramic part using conventional machining methods. Near-net shape forming involves molding a slurry or paste containing ceramic powder to the desired shape. Examples of near-net shape forming processes are slip casting, injection molding and gelation-based casting methods.

Injection molding of ceramic parts occurs in a manner similar to injection molding of plastics. A granular precursor material composed of ceramic powder dispersed in a thermoplastic organic binder system is heated until it softens and is forced into a mold cavity under high pressure e.g., 30 MPa or higher. The organic binder is then removed and the compacted powder is sintered. While the process is easily automated, there are several drawbacks. Shrinkage of the thermoplastic binder can lead to internal defects in the molded part. Binder removal is slow and can be as long as several days. Binder removal can cause deformation or cracks in the final part. The high pressures and abrasive particles lead to rapid wear of the tooling.

Slip casting uses a porous mold to remove liquid from a slurry. As liquid is removed, the suspended ceramic particles consolidate, beginning at the mold surface. Since the liquid is transported from the liquid slurry through the cast layer into the mold, soluble species such as binder molecules tend to migrate resulting in their nonuniform distribution and gradients in particle packing density. It is a fairly slow process and is labor-intensive.

Gelation-based casting methods rely on a controllable transition from a liquid slurry to a semi-rigid solid once the slurry has been introduced into a mold. Advantages of gelation-based casting are that the low viscosity slurry easily takes the shape of the mold, binder content is low and can be easily removed by pyrolysis, a variety of mold materials can be used, gelation occurs without the removal of liquid so binder migration does not occur and capital costs are low since no special machinery is required.

Two gelation-based casting methods have been previously reported. Gel Casting refers to a method by which monomers and dimmers in a slurry are polymerized in situ, forming a strong gel structure. Thus, in U.S. Pat. No. 4,894,194 acrylamide monomers are mixed into a ceramic slurry. Gelation occurs when an initiator is added which polymerizes the monomers. This method has been used successfully for a wide range of powders. The main drawback of the process is that it uses acrylamides, which before polymerization are neurotoxins. Another drawback is that some mold materials have been reported to interfere with the gelation process.

Direct Coagulation Casting (DCC) involves the coagulation of electrostatically dispersed particles in the slurry. This is done by disrupting the electrostatic stabilization mechanism by altering the pH or the ionic strength of the system by means of enzyme-catalyzed reactions. The main drawback of this process is that no organic binders are involved, so the strength of the unfired casts is low. Difficulty may be encountered in handling the parts and they cannot be green machined.

Direct Coagulation Casting (DCC) has been initially described by Graule, Baader and Gauckler of the Swiss Federal Institute of Technology initially described in T. J. Graule, F. H. Baader and L. J. Gauckler, "Direct Coagulation Casting (DCC)—Principles of a New Green Shaping Technique," pp. 626–31 in Fifth International Symposium on Ceramic Materials and Components for Engines, edited by D. S. Yan, X. R. Fu and S. X. Shi, World Scientific, New Jersey, 1994. In this process an electrostatically stabilized suspension of particles is caused to coagulate by a pH shift or an increase in salt concentration which causes a lowering of the electrostatic repulsion between particles. The coagulation is driven by addition of an initiator which slowly changes the pH or ionic strength of the system.

SUMMARY OF THE INVENTION

Binder Coagulation Casting (BCC) is a novel near-net-shape process for fabricating ceramics. An aqueous ceramic slurry containing polyelectrolyte deflocculants such as polycarboxylic acid and high molecular weight binder is gelled in a controlled fashion by the action of a chemical initiator and/or by increasing the temperature of the slurry. The mechanism by which gelation occurs is the coagulation of dispersed ceramic particles by high molecular weight binder molecules as the level of adsorption and conformation of polymer molecules change as the pH of the system changes.

Alumina, zirconia and mixtures of these two powders have been successfully cast using the BCC process. Mullite can be cast when kaolin or alumina are added. Oxides such as silica which do not adsorb significant amounts of polyacrylic acid from solution were not found suitable for the BCC process, nor were nonoxide powders.

The total organic content of specimens prepared using the BCC process may be less than 1%, and green strength is good. Specimens can be cast into fairly complex shapes and a variety of mold materials may be used. Dried casts can be green machined. Dried casts exhibited good sintering behavior and a sintered density exceeding 99% of the theoretical maximum density was achieved for alumina and zirconia ceramics.

The method comprises the steps of:
1) forming a suspension comprising water, deflocculant and ceramic powder or powders.
2) mixing the slurry to achieve good dispersion of the powder.
3) adding binder and continuing mixing.
4) adding a chemical initiator, stirring and transferring the slurry to a mold and for heating to a temperature between room temperature and 60° C.

DETAILED DESCRIPTION OF THE INVENTION

The binder coagulation casting (BCC) system consists of a highly loaded suspension or slurry of ceramic powder or powders in water with polymeric additives which can be gelled in a controlled manner. A low molecular weight polycarboxylic acid (usually added in the form of a neutralized salt solution) can be used as a deflocculant, to disperse the particles and lower the slurry viscosity. A binder such as a high molecular weight polycarboxylic acid is added at a level of about 0.1% of the weight of the dry powder. The slurry is gelled in a controlled fashion by either adding a chemical initiator which changes the pH of the system over a time period of 10 to 60 minutes. This allows sufficient time for deairing the slurry and transferring it into a mold before the onset of gelation, or heating the mold and slurry to accelerate the gelatin process. As a preferred embodiment, both heating and adding a chemical initiator are used.

Advantages of the BCC system over other near-net-shape forming processes such as injection molding and other gel casting systems are that the BCC system uses nontoxic materials, the binder content is very low, the casts have high green strength (before sintering) once dried and the casts are green machinable.

The first step in the process is forming a suspension comprising water, deflocculant and ceramic powder or powders. It may also be desirable to add other ingredients to the slurry such as pH modifier, surfactant, defoaming agent, plasticizer, etc.

It is common practice in the art to prepare ceramic slurries by first preparing a solution comprising water, defocculant, pH modifier and other water soluble components and then adding the ceramic powder to the solution.

Polyelectrolytes such as low molecular weight salts of polycarboxylic acid are commonly used as deflocculants in ceramic slurries. It was determined that an excess of the low molecular weight deflocculant was required above the amount needed for initial deflocculation of the powder, otherwise the slurry would instantly gel on addition of the high molecular weight binder. As pH is lowered, more deflocculant is adsorbed onto the powder, and the shielding action provided by the deflocculant is reduced, allowing gelation to occur from particle bridging produced by coagulated binder molecules. The effects of thermal and chemical gelation may enhance the process by providing a mechanism for binder molecules from neighboring particles to interact with each other and form the continuous polymer-powder network required for a cast to maintain its shape. The deflocculant is preferably polyacrylic acid but can be polymethacrylic acid, polycarboxylic acid or the like. A useful range of molecular weights is 2000–15000.

The ceramic powder can be selected from the group consisting of but not limited to alumina, zirconia, mullite ($Al_6Si_2O_{13}$) and cordierite ($Mg_2Al_4Si_5O_8$) and mixtures thereof. The amount of ceramic powder in the suspension can be from about 25% to 65% on a volume basis. The pH modifier can be an organic or inorganic acid or base and will preferably hold the slurry at a pH of 7.5 to 7.8. Glacial acetic acid is the preferred pH modifier and is generally added in the amount of 0.25 to 0.50 ml per 1000 grams of dry powder.

In step 2, the slurry is mixed to achieve good dispersion of the powder. A number of mixing methods that are commonly used in the art can be used for mixing, such as ball milling, attrition milling, ultrasonic mixing, and the like.

The third step is adding the high molecular weight binder and continuing mixing. The binder can be selected from the group comprising polyacrylic acid, polymethyacrylic acid, polycarboxylic acid and the like preferably has a molecular weight of 30,000 to 450,000. It may be desirable to add binder in the form of an aqueous solution to facilitate the dispersion of the binder uniformly throughout the slurry. The binder is generally added in the form of a 10% to 55% aqueous solution. However, the binder can be added as a powder if sufficient time is allowed for mixing, e.g., 12 hours mixing after the addition of 0.2 grams of dry binder.

While the initial slurry is typically very fluid, which allows good dispersion to occur, addition of the binder solution results in a viscosity increase. In cases where insufficient deflocculant is used, the slurry will gel upon addition of the binder. Slurry viscosity depends on the solids loading and deflocculant level. The amount of binder may also influence viscosity, but to a lesser extent. Viscosity should be low enough to allow good deairing. Useful viscosities are generally less than 2000 MPas.

In step 4, a chemical initiator is added to the slurry and the slurry is stirred.

A vacuum of 27 to 28 in. of Hg maintained for 2 to 3 minutes or other methods are useful to remove entrained air and dissolved gases from the slurry. Entrained air forms bubbles which cause pores in the final cast. Dissolved gases form bubbles when the slurry is heated which can cause cracks in the sintered part. If additional gas is evolved after the onset of gelation, more cracks will occur. Addition of a defoaming agent is useful in initiating removal of entrained air.

The gelation process is induced by a pH change which is controlled by the initiator. Elevated temperatures increase the rate of the pH change. A secondary thermal gelation mechanism is believed to be present. When the initiator is added, the pH of the slurry rapidly drops by about 1 pH unit and the slurry viscosity drops as well. This viscosity drop aids in mixing and deairing. As pH drops further, viscosity increases and gelation occurs.

Any initiator which is a chemical compound or combination of compounds that lowers the pH of the slurry in a reliable, time-dependent manner can be used. Two types chemical systems that undergo reactions that lower pH in a reliable time-dependent manner and may be used to initiate gelation are hydrolysis reactions, and enzyme catalyzed reactions. The preferred initiator is gluconolactone.

The defoamer used is generally an immiscible liquid which destabilizes liquid/vapor interfaces in a foam. Examples of useful defoamers are polypropylene glycol, petroleum derivatives, and the like.

A typical casting procedure is as follows:

1. 80 grams of slurry is weighed into a 100 ml beaker.
2. 3 drops of defoaming agent is added.
3. 0.75 grams of initiator is added and slurry is stirred briefly with a spatula.
4. A magnetic stir bar is placed in the beaker and the slurry is placed in a vacuum desiccator. While stirring, a vacuum of 28 in. of Hg is maintained for 2–3 minutes.
5. Slurry is poured into a mold. The exposed surface of the slurry is covered with an immiscible liquid to prevent drying. A flat glass cover is placed over the immiscible liquid.
6. Mold containing slurry is placed in an oven at a temperature of 21° C. to 60° C. or otherwise heated for a period of 10 to 60 minutes.
7. Mold is removed from the oven and allowed to cool for 10 to 30 minutes.
8. The mold is opened and cast is allowed to dry in air until the cast is firm and easily removed from the mold.

After the mold and slurry are placed in the 60° C. oven, their temperature increases with time. The maximum temperature reached depends on the time in the oven. Lower temperatures are desirable since the evolution of any gases dissolved in the liquid phase of the slurry (or possibly adsorbed on the powder surface) is more likely to occur at a higher temperature.

After the mold and slurry have been removed from the oven, the strength of the gel continues to increase. This may be from additional coagulated structure building from additional time of heating due to the residual heat in the mold and cast during the initial stage of cooling, or it may be a result of the decrease in temperature. Depending on the slurry formulation, the mold can be opened as soon as 20 minutes after it was placed in the oven. The firmness of the cast depends on the type of materials used, the solids loading in the slurry, the defloculant level, and the casting time and temperature. The amount of binder and initiator added and the age of the slurry also influence the firmness of the cast.

The cast can be removed from the mold almost immediately after the mold is opened, but the casts are somewhat soft. Less deformation occurs when the cast is allowed to air dry while supported by the mold. In some cases it is desirable to release the cast into a cradle designed to support the cast while drying occurs.

Additional materials can be added to the dispersion of this invention, including pH modifiers, surfactants, defoaming agents and plasticizers.

The novelty of this invention can be best understood from the following i) working and ii) comparative examples and the accompanying tables.

i) WORKING EXAMPLES

Working examples of this invention were primarily focused for producing complex shapes of some selected ceramic and ceramic composite systems including alumina, zirconia, zirconia-alumina composites, mullite and cordierite by the binder coagulation casting process. Some examples of materials used in this invention are described below:

Materials

1. Organic Additives

The initial development of the BCC system was performed using ammonium polyacrylate defloculant with molecular weight of 6000, and polyacrylic acid binder with molecular weight of 450,000. Subsequent research has evaluated a number of polyelectrolyte defloculants and binders from the polycarboxylic acid family, with favorable results. Defloculants that were tested are listed in Table I. Binders are listed in Table II.

2. Ceramic Powders

Initially, the BCC process was developed using alumina (Alcoa A39-SG). A wide range of powders and powder combinations were tested. The powders are listed in Table III. Specific powder combinations are discussed in a later section.

3. Initiator

The initiator used in all experiments was gluconolactone (Aldrich Chemical Company), CAS number 90-80-2. This chemical is also known as δ-Gluconolactone or D-gluconic acid δ-lactone.

4. Molds

Specimens were cast in molds fabricated from a variety of materials with a variety of geometries. Descriptions of the molds are listed in Table IV. The molds can preferably be fabricated from a material selected from the group consisting of aluminum, polyurethane, polypropylene, polyethylene and Teflon™. Molds were coated to prevent the cast from adhering to the mold surface. Coating materials successfully used were light mineral oil (3-In-One Oil Spray, Boyle-Midway), lithium grease (LubriMatic, Witco) and oleic acid. To prevent drying of the exposed surface of the slurry during casting, this surface was covered with polypropylene glycol (Polyglycol P-1200, Dow) or silicone oil (500 cps Viscosity, Brookfield Engineering Laboratories).

TABLE 1

Defloculants Evaluated For Use in The BCC Process

| Deflocculants | Source | Chemical Name | Cation of Base | MW | Solids (%) |
|---|---|---|---|---|---|
| Darvan 821A | R. T. Vanderbilt | polyacrylic acid salt | $NH_4+$ | 6000 | 40 |
| Darvan 811 | R. T. Vanderbilt | polyacrylic acid salt | $Na+$ | 6000 | 43 |
| Darvan C | R. T. Vanderbilt | polymethacrylic acid salt | $NH_4+$ | 15000 | 25 |
| PAA-2000 | Aldrich | polyacrylic acid | MEA* | 2000 | 100 |
| PAA-5000 | Aldrich | polyacrylic acid | MEA* | 5000 | 100 |
| Duramax D-3021 | Rohm and Haas | polycarboxylic acid salt | $NH_4+$ | 2500 | 40 |
| Duramax D-3019 | Rohm and Haas | functionalized polyacrylate copolymer | $NH_4+$ | 2300 | 50 |

*monoethanolamine base - added separately

TABLE II

Binders evaluated in the BCC Process

| Binder | Source | Chemical Name | MW |
|---|---|---|---|
| Carbopol 679 | B. F. Goodrich | Polyacrylic Acid | 450,000 |
| PMA | PolySciences | Polymethacrylic Acid | 100,000 |
| PAA-90000 | Aldrich | Polyacrylic Acid | 90,000 |
| Duramax B-1043 | Rohm and Haas | Polycarboxylic Acid | not known |
| Duramax B-1033 | Rohm and Haas | Polycarboxylic Acid, Sodium Salt | not known |

TABLE III

Ceramic Powders Used in Evaluating the BCC Process

| Powder Type | Source and Tradename | Mean Particle Size (μm) | Specific Surface Area (m²/g) | Comments |
|---|---|---|---|---|
| Alumina | A39-SG Alcoa | 0.5 | 10 | |
| Spinel | | | | Prepared from $Mg(NO_3)_2$ and $AlCl_3$ solution, dried and calcined to 960° C. |
| TZP Zirconia | HSY-3 Zirconia Sales (America) | 0.5 | 6.5 | 5.4% $Y_2O_3$ |
| PSZ Zirconia | TAM | 0.8 | | 3.3% MgO co-precipitated |
| Alumina | Alcoa A152-SG | 1.3 | 5.9 | |
| Kaolin | EPK Feldspar Corp | 2.0 | 27 | |
| Talc | MP40-27 Barretts Minerals | 4.7 | 7.0 | |

TABLE III-continued

Ceramic Powders Used in Evaluating the BCC Process

| Powder Type | Source and Tradename | Mean Particle Size (μm) | Specific Surface Area (m²/g) | Comments |
|---|---|---|---|---|
| Mullite | Kyanite Mining | 6.4 | | milled to reduce particle size |
| Cordierite | Corning, Inc. | 4.2 | | crushed and milled catalytic converter substrates |

TABLE IV

Description of Molds used in BCC Testing

| Mold Material | Outside Dimensions (mm) | Cavity Dimensions (mm) and Geometry | Comments |
|---|---|---|---|
| Aluminum | 75 × 51 × 51 | 30 × 30 × 10 rectangular block | |
| Aluminum | 51 × 51 × 51 | 40 × 30 × 10 block | |
| Teflon ™* | 85 × 40 × 18 | 74 × 16 × 6 block | |
| Teflon ™* | | ~30 mm disk | 30 ml Teflon PFA Griffin low form breaker (Nalge) |
| Aluminum | 70 × 25 × 18 | 60 × 5 × 4 rectangular bar | |
| Urethane Elastomer | 54 × 45 × 40 | 1½ × ½ inch hex bolt. | Mold made from standard bolt using urethane molding compound (PMC-744 Smooth-On) |
| Aluminum | 63 × 71 × 75 | 38 × 26 spool with 6 mm bore | steel rod to form bore |
| Polystyrene | | 82 mm disk | disposable petri dish |
| Polypropylene | | 14 mm diam cylinder with conical tip | disposable centrifuge tube |

*Teflon ™ is tetrafluoroethylene (DuPont)

Experimental Details

The BCC process worked well with alumina and zirconia, and mixtures of these two powders. Favorable results were also obtained using a slurry containing 96% alumina with 2% each of talc and kaolin and using a mullite slurry which contained an addition of 10% alumina or kaolin, but these systems require additional work to optimize gelation behavior. In general, nonoxide systems did not gel using the BCC process. Silica, mullite and cordierite did not gel when each was used as the only powder in the system, but favorable results were obtained using mullite with added alumina or kaolin. Tests using the different types of polycarboxylic acids and salts as binder and deflocculant were favorable with good gelation occurring in most cases.

A. Alumina System—Optimization of Processing Variables

A Box-Behnkin designed experiment was performed on the alumina system in order to determine the influence of three slurry variables on casting performance: solids loading, deflocculant level and binder concentration. The desired properties are as follows. A low slurry viscosity is desired for ease of filling the molds and for efficient deairing. A high gel strength is required to form a durable cast. The cast should be firm and strong enough to be removed from the mold. Green strength should be high enough for handling and for green machining, if required. Sintered density should be high and total shrinkage should be low. Fired specimens should be crack free, and of controlled geometry.

The 15 formulations that were prepared are listed in Table V. A small amount of acetic acid (0.25 ml) was added to each before the powder was added in order to adjust the slurry pH to between 7.5 to 7.8. The slurries were prepared in the order listed, which was randomized. Three slurries were of identical formulation in order to determine a standard deviation of the measurements. Specimens were cast into the large brick mold using 0.5 g of gluconolactone initiator per 80 grams of slurry. Casts were gelled in a 60° C. oven for 60 minutes.

Experimental Design Set for Optimizing the BCC Process for Alumina

TABLE V a. Batch Formulations

| | A39 Alumina (g) | Spinel* (g) | Water (ml) | Darvan 821A (g) | 10% Carbopol Soln (g) |
|---|---|---|---|---|---|
| GS #1  | 500 | 0.30 | 129  | 5.0  | 2.5  |
| GS #2  | 400 | 0.24 | 155  | 16.0 | 3.0  |
| GS #3  | 500 | 0.30 | 130  | 20.0 | 5.0  |
| GS #4  | 400 | 0.24 | 155  | 10.0 | 4.0  |
| GS #5  | 400 | 0.24 | 159  | 4.0  | 3.0  |
| GS #6  | 600 | 0.36 | 110  | 15.0 | 3.0  |
| GS #7  | 500 | 0.30 | 130  | 20.0 | 2.5  |
| GS #8  | 500 | 0.30 | 130  | 12.5 | 3.75 |
| GS #9  | 600 | 0.36 | 115  | 9.0  | 4.5  |
| GS #10 | 600 | 0.36 | 110  | 15.0 | 6.0  |
| GS #11 | 500 | 0.30 | 130  | 12.5 | 3.75 |
| GS #12 | 500 | 0.30 | 130  | 12.5 | 3.75 |
| GS #13 | 600 | 0.36 | 110  | 24.0 | 4.5  |
| GS #14 | 400 | 0.34 | 155  | 10.0 | 2.0  |
| GS #15 | 500 | 0.30 | 130+ | 5.09 | 5.0  |

*spinel added as sintering aid and grain growth inhibitor b. Percentage Basis (dry weight of powder = 100)

| | Solids (vol %) | Spinel (wt %) | Water (wt %) | Darvan 821A (wt %) | Binder Solids (wt %) |
|---|---|---|---|---|---|
| GS #1  | 45 | 0.06 | 25.8 | 1.0 | 0.050 |
| GS #2  | 35 | 0.06 | 31.0 | 4.0 | 0.075 |
| GS #3  | 45 | 0.06 | 26.0 | 4.0 | 0.100 |
| GS #4  | 35 | 0.06 | 31.0 | 2.5 | 0.100 |
| GS #5  | 35 | 0.06 | 38.8 | 1.0 | 0.075 |
| GS #6  | 55 | 0.06 | 18.3 | 2.5 | 0.050 |
| GS #7  | 45 | 0.06 | 26.0 | 4.0 | 0.050 |
| GS #8  | 25 | 0.06 | 26.0 | 2.5 | 0.075 |
| GS #9  | 55 | 0.06 | 19.2 | 1.0 | 0.075 |
| GS #10 | 55 | 0.06 | 18.3 | 2.5 | 0.100 |
| GS #11 | 45 | 0.06 | 26.0 | 2.5 | 0.075 |
| GS #12 | 45 | 0.06 | 26.0 | 2.5 | 0.075 |
| GS #13 | 55 | 0.06 | 18.3 | 4.0 | 0.075 |
| GS #14 | 35 | 0.06 | 38.8 | 2.5 | 0.050 |
| GS #15 | 45 | 0.06 | 26.0 | 1.0 | 0.100 |

1. Slurry Viscosity

Deflocculant level was seen to influence slurry rheology. At each deflocculant level, data for different solid loadings and different binder concentrations are plotted. At the lowest deflocculant level (1.0 wt %), the slurries gelled upon addition of the PAA binder and were unusable. Since viscosity measurement of these gelled slurries was impossible, a dashed curve is drawn to approach an arbitrary high value, with no data points plotted at 1.0% deflocculant. Viscosity was lowest at the intermediate deflocculant level and slightly higher at the high level.

Slurry viscosity increased with increasing solids loading. Points were plotted at each solids loading for slurries containing different deflocculant and binder levels. Binder concentration was not seen to have a statistically significant influence on viscosity of slurries prior to coagulation.

2. Gel Viscosity

A Brookfield viscometer with a "T-bar" spindle was used to evaluate gel strength, or more accurately, the apparent viscosity of the gelled slurry. The T-bar spindle shears through undisturbed material, giving an indication of the strength of the gel. Gel viscosity was found to be influenced by solids loading and by deflocculant level. Binder concentration was not seen to have an influence within the range tested. Slurries of higher solids loading were of higher gel viscosity and gel strength, and at higher deflocculant levels, gel viscosity decreased. This was also observed qualitatively while casting specimens. The slurries of lower solids loading or of higher deflocculant level were more likely to form soft casts which would deform and slump when the mold was opened.

3. Drying Shrinkage

Drying shrinkage in the range of 2% to 8% decreased as solids loading was increased. This shrinkage was caused by contraction of the coagulated binder between particles in the cast as water was removed. A small contraction of the cast during gelation (less than 1% linear shrinkage) was also observed, but not quantitized. This appeared to decrease as solids loading was increased.

4. Green Density and Firing Shrinkage

Specimens were sintered to 1600° C. in air following the schedule given in Table VI. Green density, sintered density and firing shrinkage are linked by the conservation of mass, following the relation:

$$\text{Shrinkage } \% = 100 \left[ 1 - \left( \frac{D_1}{D_2} \right)^{1/3} \right] \quad (1)$$

where $D_1$ and $D_2$ are density in units of g/cm$^3$ Deviations from this behavior indicate the presence of large pores which do not close during sintering. Some specimens prepared in this set of experiments deformed to the point where accurate measurement of green density was difficult, and for these an approximate green density was calculated. For the specimens where green density was able to be measured, excellent agreement with Equation 1 was seen.

TABLE VI

Sintering Schedule used for Alumina

| Heating Rate (K/min) | Range (° C.) | Dwell (min) |
| --- | --- | --- |
| 5 | 20–900 | 0 |
| 10 | 900–1375 | 0 |
| 2 | 1375–1500 | 0 |
| 1 | 1500–1600 | 24 |

As expected, green density increased with solids loading. Green density was typically 1.05× the slurry solids loading, which is consistent with green shrinkage measurements. Green density was also slightly higher for slurries containing a higher level of deflocculant. The reason for this is not clear. Fired shrinkage was lower for specimens of higher solids loading and higher deflocculant level, following Equation 1. Shrinkage ranged from 15% for specimens cast from 55 vol % solids slurry to 19.5% for specimens cast from 35 vol % solids slurry.

Sintered density was not influenced by any of the slurry variables. Specimens sintered to an average density of 99.4% of theoretical, with a standard deviation of 0.1%. This shows that the BCC process results in a very uniform microstructure, free from large pores.

These results imply that the optimum gel casting system should be of high solids loading, to maximize gel strength and minimize shrinkage, and should have as low a deflocculant level as possible to achieve a high gel strength, while keeping slurry viscosity low.

5. Sintered Strength

Three samples of the sintered material (GS#8, GS#11 and GS#12, which were of identical composition) were machined into test specimens with dimensions 3×43×45 mm to meet MIL STD 1942, "4-Pt. Flexural Testing Standard," Army Materials Technology Lab, Watertown, Mass., 1979, and tested for flexural strength in four point bending geometry. The mean strength was 404.1 MPa, with standard deviation of 59.4 MPa. This strength is only slightly lower than the strength of alumina specimens prepared by optimized powder compaction technology using a similar alumina. The number of specimens tested was insufficient to accurately determine a Weibull modulus. The estimated Weibull modulus from 10 specimens, with a 90% confidence interval, was 8±4.

B. Alumina System

Two sets of slurries were prepared that enabled evaluation of different deflocculants and binders from the polycarboxylic acid family in the BCC process. Table VII shows three formulations with polyacrylic acid deflocculant neutralized by different bases. Table VIII shows four formulations with different deflocculants and different binders.

Each of the slurries from the first set (Table VII) was cast in the large rectangular block mold following the standard procedure, using 0.5 grams of initiator per 80 grams of slurry. The mold was placed in a 60° C. oven for 60 minutes. All slurries gelled to form firm casts. This demonstrates that the cation or base which is used to neutralize the low molecular weight PAA dispersant is not a critical factor in the BCC process.

Each of the slurries in the second set (Table VIII) was cast using 0.5 gram of initiator per 80 grams of slurry. These were cast in the small brick molds, and were heated in a 60° C. oven for 30 minutes. All successfully gelled to form good casts with the exception of BCC#34, which formed a soft gel which collapsed when the mold was opened. These results show that the BCC process can be used with a wide range of polycarboxylic acid polymers. The range of deflocculants that were used ranged in molecular weight from 1000 to 15,000. The binders ranged in molecular weight from 90,000 to 450,000. Polymers included polyacrylic acid, polymethacrylic acid and other commercial polycarboxylic acids which have proprietary compositions.

C. Alumina System—Casting Time

The influence of casting time on gelation was measured using the alumina slurry with MEA neutralized PAA-2000 as the deflocculant (BCC#15). Initiator was added as the level of 0.5 grams per 80 grams of slurry. The slurry was poured into aluminum molds (short block geometry) which were placed in a 60° C. oven for different time periods. The temperature of the mold was calibrated using a thermocouple that was placed in a hole drilled in the aluminum mold. By comparing this temperature with that measured with a thermocouple placed directly in the slurry, it was determined that the aluminum mold and slurry heated at the same rate. Mold and slurry temperature change with time in the oven.

Heating times from room temperature were varied from 0 to 60 minutes, which corresponds with maximum casting temperatures of 57° C. Molds were allowed to cool for 15 minutes before opening them. The room temperature cast did not gel. After 5 minutes in the oven (maximum temperature 33° C.) a successful cast was obtained, but the gel was soft when the mold was opened. At all longer heating times, good casts were obtained which had excellent gel strength. Other experiments indicated that for longer casting times the mold could be opened after shorter cooling times. For this formulation, the minimum total casting time (heating plus cooling) appears to be 20 minutes.

TABLE VII

BCC Test Formulations with Different Deflocculants

|  | GS #8 | BCC #9 | BCC #10 |
|---|---|---|---|
| Darvan 821A (g) | 12.5 |  |  |
| Darvan 811 (g) |  | 12.5 |  |
| PAA-2000 (g) MEA |  |  | 4.0 |
|  |  |  | 2.4 |
| Acetic Acid (ml) | 0.25 | 0.25 | 0.25 |
| Water (ml) | 130 | 130 | 130 |
| A39-SG Powder (g) | 500 | 500 | 500 |
| Spinel (g) | 0.30 | 0.30 | 0.30 |
| 10% Carbopol Soln (g) | 3.75 | 3.75 | 3.75 |
| PAA MW | 6000 | 6000 | 2000 |
| PAA solids (g) | 4.1 | 4.1 | 4.0 |
| Cation or Base | NH$_4$+ | Na+ | MEA* |

*MEA is monoethanol amine

TABLE VIII

BCC Formulations with Different Deflocculants and Binders

|  | BCC #31 | BCC #32 | BCC #33 | BCC #34 |
|---|---|---|---|---|
| Darvan C (g) | 13 |  |  |  |
| 50% PAA-5000 soln (g) |  | 5.2 |  |  |
| MEA |  | 1.5 |  |  |
| D-3021 (g) |  |  | 8.1 |  |
| D-3019 (g) |  |  |  | 6.5 |
| Water (ml) | 75 | 75 | 75 | 75 |
| A39-SG Alumina (g) | 400 | 400 | 400 | 400 |
| Spinel (g) | 0.24 | 0.24 | 0.24 | 0.24 |
| 10% PMA soln (g) | 2.0 |  |  |  |
| 25% PAA-9000 soln (g) |  | 0.8 |  |  |
| B-1053 (g) |  |  | 0.36 |  |
| 10% B-1033 soln (g) |  |  |  | 2.0 |
| Deflocculant Solids | 2.6 | 2.6 | 2.6 | 2.6 |
| Cation or Base | NH$_4$ | MEA | NH$_4$ | NH$_4$ |
| Binder Solids | 0.2 | 0.2 | 0.2 | 0.2 |

A second casting time experiment was performed using an alumina slurry with PAA (Darvan 821A) as the deflocculant. Longer casting times were required with a good cast being obtained after heating for 15 minutes (42° C. maximum temperature) and cooling for 15 minutes. When the mold was opened after cooling for 10 minutes that cast was not completely gelled. So it can be concluded that both time and temperature play a role in the gelation process.

Casts were found to be more prone to internal cracks when the casting temperature was higher. One common type of defect was laminar cracks. The origins of the cracks were small bubbles. As the slurry was heated, dissolved gases in insufficiently deaired slurries were released forming bubbles since gases are less soluble in water at higher temperatures. After the onset of gelation, additional release of gas caused the gel to tear. The gelling cast would actually expand out of the top of the mold as the laminar cracks opened up as this additional gas was released. Shorter casting times, which translate to lower casting temperatures lessened the tendency for formation of these laminar cracks, as did longer deairing times.

D. 96% Alumina

Two slurry formulations were prepared for a typical 96% alumina composition which contained small amounts of talc and kaolin which on sintering can form a glassy phase which bonds the alumina particles. The batch formulations are shown in Table IX. Two differences exist between the two slurry formulations—solids loading and deflocculant level. The first slurry BCC#23 with 50 vol % solids was cast using 0.50 g of initiator per 80 g of slurry. After 30 minutes in a 60° C. oven, the slurry did not gel. After 50 minutes a soft gel was formed. The slurry was then cast using 0.75 g of initiator. This time a soft gel formed after 30 minutes in the oven. Since the viscosity of BCC#23 slurry was very low, the second formulation, BCC#27 was prepared at higher solids (55 vol %). The deflocculant level was decreased in order to increase the gel strength. The slurry was cast using both 0.5 and 0.75 grams of initiator with improved results over BCC#23. Using 0.75 grams of initiator, a firm cast was obtained after 30 minutes in a 60° C. oven. Slurry viscosity was still low and solids loading could be further increased. The casts for the 96% alumina formulations contained internal laminations due to bubbles formed in the gelling slurry. Two possible reasons explain these defects. Kaolin has a very high surface area and the bubbles may be caused by the release of adsorbed gases from the kaolin surface. Or the bubbles may be a result of decomposition of some surface phase on one of the powders as the slurry becomes more acidic.

TABLE IX

BCC Formulations for 96% Alumina

|  | BCC #23 | BCC #27 |
|---|---|---|
| Darvan 821A (g) | 12.5 | 6.5 |
| Water (ml) | 120 | 100 |
| Acetic Acid (ml) | 0.25 | 0.25 |
| A152-SG Alumina (g) | 480 | 480 |
| Kaolin (g) | 10 | 10 |
| Talk (g) | 10 | 10 |
| 10% Carbopol Solution (g) | 2.5 | 2.5 |

E. Fully Stabilized Zirconia

A fully stabilized tetragonal zirconia polycrystal (TZP) slurry was prepared using the formulation in Table X. The solids loading of 42 vol % appears to be a functional maximum for this powder due to the very small particle size and high specific surface area. The relative volume of adsorbed polymer to volume of ceramic increases as the particle size decreases. The slurry had good fluidity. Specimens were cast in the large brick mold using 0.75 g of initiator per 80 g of slurry. The molds were heated in a 60° C. oven for 30 minutes. The casts had excellent gel strength. Five specimens were cast and were sintered to 1500° C. in flowing oxygen (0.8 LPM) using the firing schedule in Table XI. Average sintered density was 6.063 g/cm$^3$ or 99.6% of the theoretical value of 6.089 g/cm$^3$. Because of the low initial solids loading in the slurry, shrinkage was 27%.

TABLE X

TZP Zirconia Formulation for BCC

| Material | Amount |
|---|---|
| Water (ml) | 105 |
| Darvan 821A (g) | 5 |
| Acetic Acid (ml) | 0.25 |

TABLE X-continued

TZP Zirconia Formulation for BCC

| Material | Amount |
| --- | --- |
| TZP Zirconia (g) | 400 |
| 10% Carbopol Solution (g) | 2.0 |

TABLE XI

Sintering Schedule Used for Zirconia

| Heating Rate (K/min) | Range (° C.) | Dwell (min) |
| --- | --- | --- |
| 5 | 20–500 | 0 |
| 10 | 500–1300 | 0 |
| 2 | 1300–1400 | 0 |
| 1 | 1400–1500 | 30 |

Sintered Strength

Five bricks were cast and sintered and machined into a total of twenty test bars with dimensions 3×4×43 mm for flexural strength testing. Four of the machined bars contained visible cracks which were not evident in the sintered bricks. For the set, including the cracked bars, the mean strength was 774.5 MPa with standard deviation of 175.3 MPa. The Weibull modulus of the full set was 4.5. When the cracked specimens were excluded from the calculations, mean strength was 774.5 MPa with standard deviation of 100.6 MPa, and the Weibull modulus was 9.8.

Twelve zirconia specimens were cast to the approximate dimensions of the machined test bars, and were tested in four point bending. The mean strength of this set was 433.9 MPa with standard deviation of 86.6 MPa. The higher strength of the machined specimens may be due to better surface finish or it may be a result of the machining operation itself.

F. Partially Stabilized Zirconia

Two slurries of partially stabilized zirconia (PSZ) were prepared using MgO stabilized zirconia. Formulations are shown in Table XII. Because particle size was small, slurry solids loading was low, 33 and 38 vol % for the two slurries. BCC#28 was cast using 0.75 grams of initiator per 80 grams of slurry. The cast had good gel strength but contained some bubbles since deairing was difficult due to its high viscosity. BCC#29 was of higher solids and because of its high viscosity was not cast. The slurries increased in viscosity after aging and became unusable.

TABLE XII

PSZ Zirconia BCC Slurry Formulations

|  | BCC #28 | BCC #29 |
| --- | --- | --- |
| Daravan 821A (g) | 8.25 | 10.4 |
| Water (ml) | 100 | 80 |
| Acetic Acid (ml) | 0.20 | 0.20 |
| PSZ Powder (g) | 300 | 300 |
| 10% Carbopol Solution (g) | 1.5 | 1.5 |

G. Zirconia-Toughened Alumina

Two zirconia-toughened alumina (ZTA) compositions were tested using the BCC process. Formulations are given in Table XIII. The 10% zirconia slurry was slightly more fluid than the 30% zirconia slurry because of its larger average particle size. Specimens were cast using 0.5 g of initiator per 80 grams of slurry, and heating in a 60° C. oven for 30 minutes. Both formulations gelled to form firm casts.

TABLE XIII

Zirconia-Toughened Alumina BCC Slurry Formulations

|  | BCC #25 10% Zirconia | BCC #26 30% Zirconia |
| --- | --- | --- |
| Daravan 821A (g) | 7.5 | 7.5 |
| Water (ml) | 120 | 120 |
| Acetic Acid (ml) | 0.25 | 0.25 |
| A39-SG Alumina (g) | 450 | 350 |
| Spinel(g) | 0.27 | 0.21 |
| TZP Zirconia | 50 | 150 |
| 10% Carbopol Solution (g) | 2.5 | 2.5 |

Specimens were sintered to 1600° C. using the sintering schedule used for alumina specimens (Table VI). The 10% zirconia specimen sintered to a density of 4.07 g/cm$^3$ which is 98.8% of the theoretical value of 4.12 g/cm$^3$ calculated from the density values of alumina and zirconia. The 30% zirconia specimen sintered to a density of 4.38 g/cm$^3$ which is 98.7% of the calculated density value of 4.44 g/cm$^3$.

H. Mullite and Cordierite

Mullite ($Al_6Si_2O_{13}$ or $3Al_2O_3.2SiO_2$) and cordierite ($Mg_2Al_4Si_5O_{18}$ or $2MgO.2Al_2O_3.5SiO_2$) are used as refractories and were tested in the BCC process. Formulations are given in Table XIV. All of these slurries were of low viscosity and solids loading could be increased. The mullite slurry was cast using 0.75 grams of initiator per 80 grams of slurry and did not gel after 30 minutes in a 60° C. oven. The cordierite slurry was also cast with 0.75 grams of initiator, and also did not gel after 30 minutes in a 60° C. oven. The mullite slurry formulation was modified by the addition of either kaolin or alumina. When the slurry with the kaolin addition was cast using 0.5 grams of initiator per 80 grams of slurry, a soft gel formed after 30 minutes in a 60° C. oven. The gel strength increased when the mold was kept in the oven for 50 minutes, but was still insufficient to prevent the cast from tearing when the mold was opened. The slurry containing the alumina addition behaved in a similar manner to the one containing kaolin under the same processing conditions, resulting in a soft cast that tore when the mold was opened. Although some gelation occurred with the addition of the second powder these systems can be optimized to produce defect-free casts.

TABLE XIV

BCC Formulations for Mullite and Cordierite

|  | BCC #22 | BCC #22A | BCC #30 | BCC #24 |
| --- | --- | --- | --- | --- |
| Mullite (g) | 500 | 500 | 500 |  |
| Kaolin (g) |  | 55 |  |  |
| A39-SG Alumina (g) |  |  | 55 |  |
| Cordierite (g) |  |  |  | 450 |
| Water (ml) | 150 | 150 | 160 | 200 |
| Darvan 821A (g) | 12.5 | 12.5 | 4.0 | 7.5 |
| 10% Carbopol Soln (g) | 2.8 | 2.5 | 4.0 | 2.5 |

In the mullite slurry the solids loading was low and the particle size of the mullite was large (6.4 µm). With the coarse particle size, surface area is low. The BCC process has been demonstrated to depend on binder-particle interactions. The alumina and zirconia powders which were cast successfully have much higher specific surface area than the mullite used here. A finer particle size would provide more surface area for these particle/binder interactions. Higher solids loading would decrease the interparticle spacing, producing more numerous contacts between adjacent particles and reduce the water content of the gel. Both finer particle size and increased solids loading would increase the gel strength. Addition of kaolin or alumina provided a second powder which formed a gel network which supported the larger mullite particles.

The cordierite slurry was of finer particle size and of low solids loading. The failure of the system to gel probably indicates that there was little or no interaction between the powder surface and the organic polymers. Addition of alumina or kaolin would be likely to result in gel formation as occurred for mullite.

Complex Shapes

Gel casting is a near-net-shape fabrication process which is to say that complex shapes can be formed directly with only minimal machining required. In addition to the rectangular block shapes, two molds with more complex geometry were tested. The first was a spool shape. The second complex shape was a threaded bolt. The urethane elastomer mold used was easily fabricated.

Alumina and zirconia slurries have been cast in the two complex shape molds with good success. Casts of the spool shape are prone to cracking in the narrow section. This is probably due to the fact that a very small amount of shrinkage occurs during gelation which puts the narrow section under tension. Cracking may be aggravated by the withdrawal of the core rod. A plaster cradle was fabricated to support the cast so it can be removed from the mold before excessive shrinkage occurs.

The threaded bolt cast was easily removed from the flexible urethane mold. Various mold geometries and materials may be used with the BCC process.

Green Machining

Green machinability of BCC specimens was evaluated using two simple tests. First, a standard drill bit was used to drill a hole through a specimen was pressed against the side of the rotating bit. Chipping occurred for both tests for both alumina and zirconia specimens. Casts with a higher moisture content (<5% by weight) resulted in a small improvement. Addition of PEG-200 (Union Carbide Corporation) to the original formulation as a plasticizer for the binder produced a large reduction of chipping. PEG-200 was added at a level of 4 grams per 80 grams of slurry. Machining with a cobalt drill bit and tungsten carbide tools also reduced chipping. It is likely that the cobalt bit stay and tungsten carbide cutting tools sharper for a longer time than the standard carbon steel bit, and the quality of the cutting edge plays an important role in the machining process. Machining of green BCC specimens with diamond or Borozon™ tool bits produced excellent, smooth, defect free machined surfaces.

ii) COMPARATIVE EXAMPLES

Comparative examples of this invention were designed to see the feasibility of successful implementation of binder coagulation casting of some other oxide and non-oxide ceramic systems including silica, aluminum nitride, silicon carbide and silicon nitride.

a). Silica

A slurry was prepared from silica in order to determine the influence of surface chemistry on the BCC process. PAA is known to adsorb onto the surface of alumina but little or no adsorption is expected to occur on silica. The surface of silica is negatively charged at pH>2, so there is an electrostatic repulsion between the surface and the ionized of the polymer which are also negatively charged. The formulation of the silica slurry is shown in Table XV.

TABLE XV

Silica Slurry for BCC

| | BCC #18 |
|---|---|
| Silica (g) | 500 |
| Darvan 821A (g) | 12.5 |
| Water (ml) | 180 |
| 10% Carbopol Soln (g) | 3.75 |

The silica slurry was very fluid, but was shear-thickening. Initiator was added at a level of 0.5 grams per 80 grams of slurry. No gelation occurred after 45 minutes in a 60° C. oven. Therefore, it is believed that surface chemistry plays a key role in the BCC process. The deflocculant and binder must adsorb onto the surface. Any chemical or thermal gelation of the unadsorbed polymer is insufficient to provide support in the absence of particle-polymer interactions.

b). Aluminum Nitride

Slurries prepared from water-resistant aluminum nitride did not gel when the standard BCC system was used. This is because the surface interactions between the powder and polymers which are critical for the process did not occur. The viscosity of the AlN slurries actually decreased as pH decreased, the opposite of the behavior observed in the BCC process.

A slurry was prepared using a phosphate ester surfactant (Emphos CS-1361, Witco) as a wetting agent and dispersant for the hydrophobic powder. The normal BCC dispersant and deflocculant were added as well. This slurry did not gel. A acryl ethoxylate surfactant (Triton X-100, Union Carbide) was substituted for the phosphate ester since it was though that surfactant/binder interactions might assist gelation. Again, no gelation occurred, and without the phosphate ester which pacifies the surface should oxidation begin, the powder decomposed after about 24 hours. Addition of a small amount of magnesium acetate, to promote chemical gelation, likewise was unsuccessful.

2. Silicon Nitride and Silicon Carbide

When silicon nitride was cast using the BCC system of organic additives, soft casts with low gel strength were obtained. Silicon nitride has surface Si—OH, Si—NH and Si—HN$_2$ groups. Attraction between the acidic hydroxyl groups and basic amine groups limits the solids loading. High pH (~10) is required to obtain a fluid slurry by an electrostatic mechanism. Addition of deflocculant does not significantly alter this pH dependence of viscosity. The gelation that was observed upon addition of the initiator was most likely caused by disturbing the electrostatically stabilized dispersion of the particles as the pH changed. The binder and deflocculant probably did not play a significant role in the gelation, so this cannot be considered successful casting using the BCC process. Similar results were obtained using silicon carbide powder. High pH was required to obtain a fluid slurry and gelation occurred when pH was lowered by the action of the initiator. Again, the binder was not believed to play a significant role.

The invention has been described in detail with particular reference to certain preferred embodiments thereof, but it will be understood that variations and modifications can be effected within the spirit and scope of the invention.

What is claimed is:

1. The method of fabricating ceramics comprising the steps of:
    A) forming a suspension comprising water, deflocculant at an amount in excess of that needed for initial deflocculation of ceramic powder and ceramic powder;
    B) mixing the suspension to achieve dispersion of the powder;
    C) adding binder having a molecular weight of 30,000 to 450,000 and continuing mixing; and
    D) adding a chemical initiator which drops the pH of the suspension over a time period of 10 to 60 minutes to induce gelation, stirring and transferring the suspension to a mold.

2. The method of claim 1 wherein the deflocculant is a polyelectrolyte.

3. The method of claim 1 wherein the ceramic powder is selected from the group consisting of alumina, zirconia, mullite and cordierite and mixtures thereof.

4. The method of claim 1 wherein the ceramic powder is alumina.

5. The method of claim 1 wherein the ceramic powder is zirconia.

6. The method of claim 1 wherein the ceramic powder is mullite.

7. The method of claim 1 wherein the ceramic powder is cordierite.

8. The method of claim 1 wherein the binder of Step C) is selected from the group consisting of polycarboxylic acid, polyacrylic acid and, polymethacrylic acid.

9. The method of claim 1 wherein the mold is fabricated from a material selected from the group consisting of aluminum, polyurethane, polypropylene, polyethylene, and tetrafluoroethylene.

10. The method of claim 1 wherein the mixing is accomplished by ball milling, attrition milling, or ultrasonic mixing.

11. The method of claim 1 wherein the suspension of A) also comprises a pH modifier.

12. The method of claim 1 wherein the suspension of A) also comprises a surfactant.

13. The method of claim 1 wherein the suspension of A) also comprises a defoaming agent.

14. The method of claim 1 wherein the suspension of A) also comprises a plasticizer.

15. The method of claim 1 wherein step also comprises heating to a temperature between room temperature and about 60° C.

16. The method of fabricating ceramics comprising the steps of:
    A) forming a suspension comprising water, deflocculant of an amount in excess of that needed for initial deflocculation of ceramic powder and ceramic powder;
    B) mixing the suspension to achieve dispersion of the powder;
    C) adding binder having a molecular weight of 30,000 to 450,000 and continuing mixing at room temperature;
    D) adding a chemical initiator which drops the pH of the suspension over a time period of 10 to 60 minutes to induce gelation; and
    E) stirring and transferring the suspension to a mold and heating to a temperature of up to about 60° C.

17. The method of claim 16 wherein the ceramic powder is selected from the group consisting of alumina, zirconia, mullite and cordierite and mixtures thereof.

18. The method of claim 16 wherein the heating temperature of step D) is between 21° C. and 60° C.

19. The method of claim 16 wherein the heating time is between about 10 and 60 minutes.

* * * * *